United States Patent

Trummer et al.

[11] Patent Number: 4,619,097
[45] Date of Patent: Oct. 28, 1986

[54] THERMALLY INSULATED COMPOSITE FRAME MEMBER AND METHOD FOR MANUFACTURE

[75] Inventors: Joseph A. Trummer, Atlanta; El L. Coulston, Norcross, both of Ga.

[73] Assignee: Kawneer Company, Inc., Atlanta, Ga.

[21] Appl. No.: 759,692

[22] Filed: Jul. 29, 1985

[51] Int. Cl.⁴ .................. B29D 27/04; E04B 1/62
[52] U.S. Cl. ........................... 52/730; 29/418; 49/DIG. 1; 52/729; 52/732
[58] Field of Search ............... 29/418; 49/DIG. 1; 52/730, 729, 675, 732

[56] References Cited

U.S. PATENT DOCUMENTS

| | | | |
|---|---|---|---|
| 420,658 | 2/1890 | Hayes | 52/675 |
| 607,071 | 7/1898 | Ohl | 52/675 X |
| 1,444,376 | 2/1923 | Guyse et al. | 52/675 |
| 3,204,324 | 9/1965 | Nilsen | 52/730 X |
| 4,096,678 | 6/1978 | Diels et al. | 49/DIG. 1 |
| 4,128,934 | 12/1978 | Doring | 52/730 X |

FOREIGN PATENT DOCUMENTS 2709786  6/1978  Fed. Rep. of Germany ........ 52/730

Primary Examiner—Alfred C. Perham
Attorney, Agent, or Firm—Jones & Askew

[57] ABSTRACT

A thermally broken composite frame member, including inner and outer elongated metal elements in parallel spaced apart relation interconnected by a connector of rigid insulating material. The frame member includes a mechanical interlock between the metal elements and the connector which prevents the metal elements from becoming laterally or longitudinally displaced with respect to the connector in response to tensile or shearing forces. Thus, the stuctural integrity of the frame member is not solely dependent on the adhesion between the insulating material and the metal elements, and insulating materials which do not adhere to metal to any appreciable degree may be employed.

16 Claims, 6 Drawing Figures

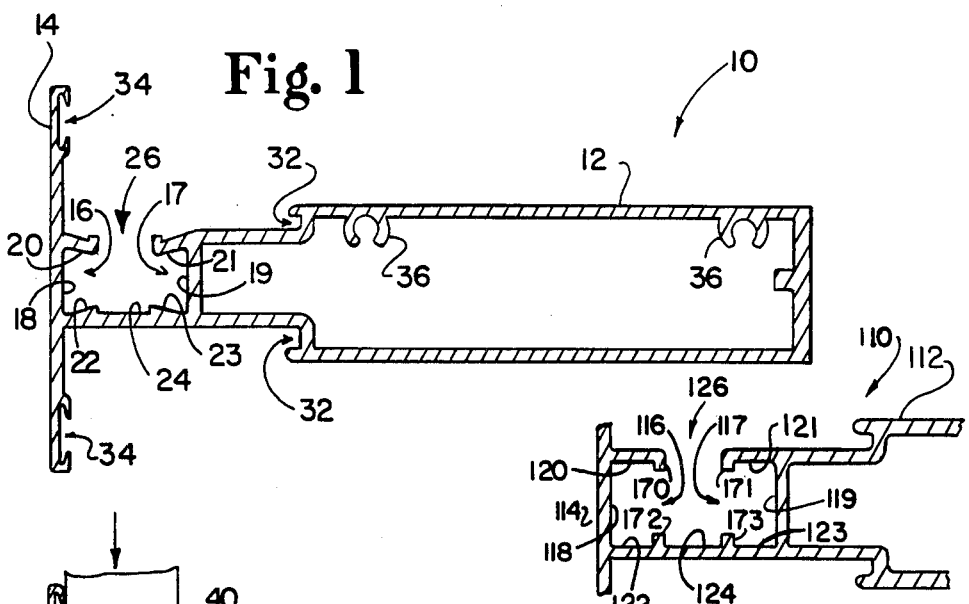
Fig. 1
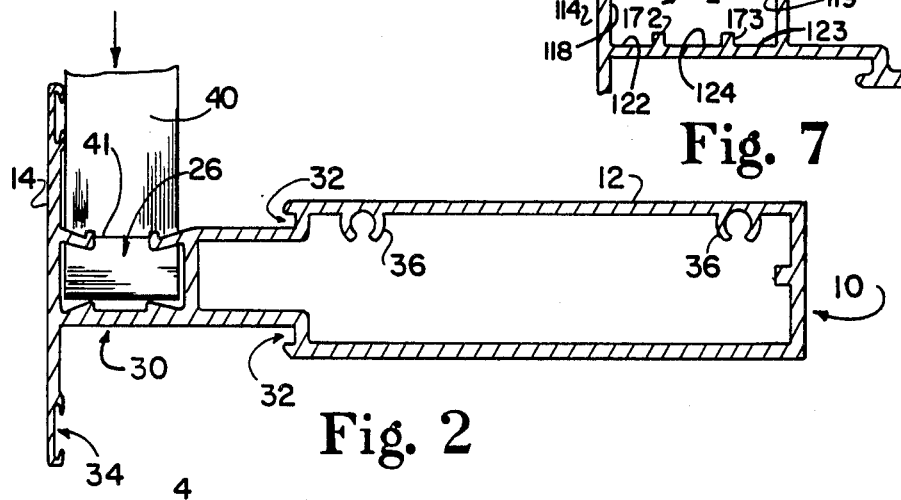
Fig. 7
Fig. 2
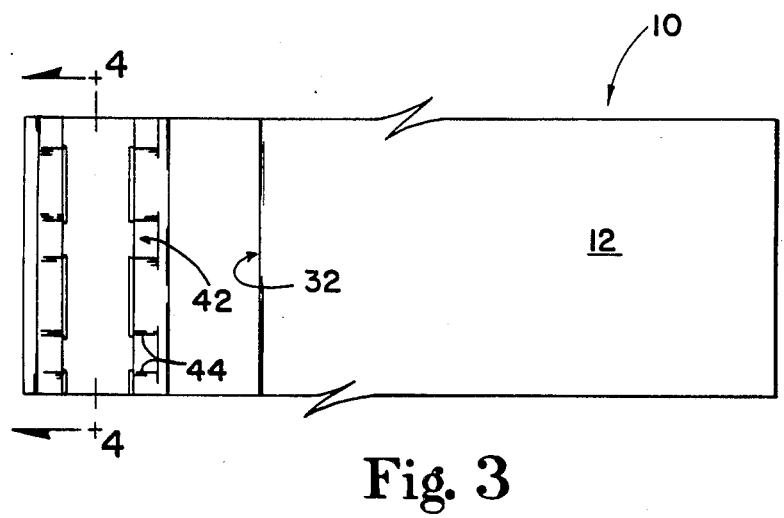
Fig. 3

THERMALLY INSULATED COMPOSITE FRAME MEMBER AND METHOD FOR MANUFACTURE

TECHNICAL FIELD

This invention relates generally to thermally insulated architectural frame members, and more specifically relates to a thermally broken frame member and method for manufacture, the frame member including an inner metal element and an outer metal element interconnected by a rigid insulating material, and the three elements being mechanically interlocked rather than being dependent entirely on an adhesive bond to form a unitary structure resistant to lateral and transverse slippage.

BACKGROUND OF THE INVENTION

Thermally insulated composite frame members for curtain walls, window frames and the like are well known in the art. Typically, such a frame member consists of two elongated metal sections (usually anodized aluminum) joined by a connector of insulating plastic material. In most conventional applications, the connector must be bonded to the outer sections to provide structural integrity of the composite member. When the adhesive bonds between this connector and each metal section are solely responsible for the structural integrity of the composite member, an insulating plastic which adheres to the metal sections, such as polyurethane, must be used. While the adhesion of polyurethane provides good initial shear strength, thermal cycling, i.e. expansion and contraction resulting from heating and cooling, will destroy polyurethane's ability to resist shear. Also, insulating plastics such as polyvinyl chloride (PVC) or acrylonitrile-butadiene-styrene (ABS) cannot be employed in such a composite member because they may not adhere to anodized aluminum to any appreciable degree.

Accordingly, it is desirable to provide a thermally insulated frame member whose structural integrity does not depend solely upon adhsive bonding between the connector and the aluminum elements, thereby permitting the utilization of non-adhering insulating plastics.

Efforts have been made to provide a thermally insulated composite frame member wherein the plastic connector is mechanically interlocked with the outer aluminum elements. One such example is disclosed in U.S. Pat. No. 3,204,324, wherein the extruded aluminum elements are provided with a plurality of longitudinal projections protruding interiorly of the channels in which the insulating connector is formed. These longitudinal projections extend into the bulk of the insulating connector and provide a mechanical interlock which serves to prevent the aluminum elements from becoming laterally disengaged from the connector in response to tensile force. However, these longitudinal projections do not prevent transverse slippage of the aluminum elements in response to shearing forces, a problem which is aggravated when the plastic connector is exposed to temperature changes and rain or other moisture.

Accordingly, there is a need to provide a thermally insulated frame member wherein the plastic connector is mechanically interlocked with the outer aluminum elements to prevent not only lateral but also transverse slippage of the aluminum elements with respect to the connector.

Conventional thermally insulated members are typically manufactured by the "pour/debridge" method. A unitary elongated aluminum member initially having an interconnecting bar or "bridge" between its inner and outer elements is provided. The bridge forms the bottom wall of an open groove into which is poured a quantity of thermally insulating plastic resin in a fluid condition. When the plastic resin cures into a solid or rigid state and the bridge is removed, the resin forms a connector between the inner and outer elements. When the bridge is removed, the two metal elements are separated but remain joined together by the insulating plastic connector. Thus, a composite structure is formed in which the two aluminum elements are thermally insulated from one another by the plastic thermal-break material.

As discussed above, it is desirable to provide a mechanical interlock to prevent the aluminum elements from being displaced with respect to the insulating connector, whereby the structural integrity of the composite member is not wholly dependent upon adhesive bonding between the plastic connector and the aluminum elements. Longitudinal projections protruding interiorly of the groove into which the plastic insulating material is added, such as those in the aforementioned U.S. Pat. No. 3,204,324, can readily be formed as part of the extrusion process of the anodized aluminum member. Such longitudinal projections extending into the bulk of the plastic connector will prevent the aluminum elements from becoming laterally displaced in response to tensile forces exerted on the outer elements. However, extruded products are essentially linear in character, in the sense that shaping is confined to the cross section only. Thus, while longitudinal projections are easily formed as part of the extrusion process, lateral projections, as would be necessary to mechanically prevent transverse slippage of the aluminum elements with respect to the connector in response to shear forces, cannot be extruded. Accordingly, there is a need to provide a process for manufacturing composite architectural frame members including lateral as well as longitudinal projections protruding interiorly of the groove into which the liquid-state plastic insulating material is poured during the pour/debridge process.

SUMMARY OF THE INVENTION

As will be seen, the present invention overcomes these and other problems associated with conventional composite insulating architectural frame members, and provides a method for manufacture of the improved frame members. Stated generally, the improved thermally broken architectural frame member of the present invention comprises a composite structure including an inner metal element and an outer metal element connected together by a rigid insulating material, the three elements being mechanically interlocked rather than being completely dependent upon an adhesive bond to form a unitary structure resistant to both lateral and transverse slippage. Stated generally, the process for manufacturing the improved frame member includes a method for forming both longitudinal and lateral projections protruding interiorly of the channels in which the insulating plastic connector is formed.

Stated somewhat more specifically, the improved thermally broken frame member of the present invention initially comprises an extruded unitary elongated member having inner and outer elongated elements positioned in adjacent spaced apart relationship with their longitudinal axes being substantially parallel. Dovetail-shaped channels are formed on mutually facing portions of each elongated element. A bar or "bridge" interconnects the bottom walls of the channels on the inner and outer elements of the extrusion to form the bottom wall of an open longitudinal groove into which a liquid-state insulating plastic material is poured. Lateral projections or tabs are formed to protrude inwardly of the channels by shearing the upper walls of the channels at intervals along the extrusion with a wedge-shaped punch aligned at substantial right angles to the longitudinal axis of the member. This punching action bends short sections of the upper channel walls to protrude inwardly of the channels at right angles to the longitudinal axis of the aluminum extrusion. The depth of these sections is controlled by the shape of the punch and the spacing between sections. According to a preferred manufacturing process of the present invention, this shearing action is performed by passing the extrusion under a rotating wheel containing a number of wedge-shaped punches extending radially therefrom to punch tabs at the desired intervals and depth.

After the lateral tabs are punched in the top walls of the channels, the groove is filled with a suitable thermal break material, such as polyurethane, PVC, or ABS, in a liquid state. When the thermal break material has cured into a solid or rigid state, the extrusion is debridged by machining in the conventional manner, separating the extrusion into non-contacting inner and outer metal elements connected by the thermally broken plastic connector. The dovetail-shaped cross section of the channels prevents the metal elements from laterally slipping with respect to the connector. Moreover, the lateral tabs punched into the upper walls of the channels extend into the bulk of the plastic connector to resist any transverse slippage of the metal elements with respect to the connector, an advantage not found in prior art thermally broken frame members.

This mechanical interlocking between the inner and outer metal elements and the plastic connector eliminates the necessity of an adhesive bond between the various components of the composite structure and permits the use of thermoplastic thermal break materials which do not adhere to aluminum to any appreciable degree. Further, the mechanical interlock, even when used with plastic resins which do adhere to aluminum, eliminates any risk of failure of a structural framing member due to adhesion loss.

Thus, it is an object of this invention to provide a composite frame member which permits the use of thermally insulating plastic materials which do not adhere to metal to any appreciable degree.

It is another object of this invention to provide a composite frame member using conventional thermal break materials, in which the connector is mechanically interlocked with the metal elements, whereby the possibility of structural failure due to loss of the adhesive bond between the connector and the metal elements is eliminated.

It is a further object of this invention to provide a composite thermally broken frame member whereby the plastic connector is mechanically interlocked with the outer metal elements to prevent not only lateral but also transverse slippage of the metal elements with respect to the plastic connector.

It is yet another object of the present invention to provide a method for manufacturing a composite thermally broken frame member in which lateral projections which cannot be formed as part of the extrusion process are formed in the extruded member to project inwardly of the channels in which the thermal break material is to be poured.

Other objects, features, and advantages of the present invention will become apparent upon reading the following specifications when taken in conjunction with the drawings and the appended claims.

BRIEF DESCRIPTION OF THE DRAWINGS

FIG. 1 is an end view of a unitary aluminum extrusion from which the preferred embodiment of a composite thermally broken frame member of the present invention is constructed.

FIG. 2 is an end view of the extrusion of FIG. 1 showing a punch shearing interruptions in the upper walls of the thermal break channels.

FIG. 3 is a top view of the extrusion of FIG. 1 with interruptions punched in the upper legs of the thermal break channels.

FIG. 7 is an end view of a unitary aluminum extrusion from which an alternate embodiment of a composite thermally broken frame member of the present invention is constructed.

DETAILED DESCRIPTION OF THE DISCLOSED EMBODIMENT

Figure 4:
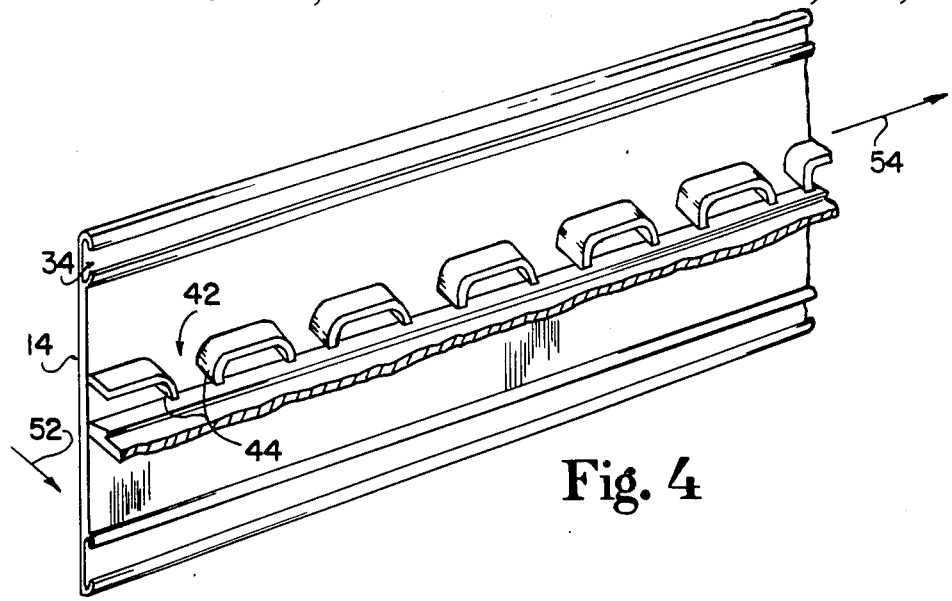
FIG. 4 is a cutaway perspective view taken along section lines 4—4 of the extrusion of FIG. 3.

Referring now in more detail to the drawing, in which like numerals indicate like elements throughout the several views, FIG. 1 shows an end view of a metal extrusion shown generally at 10, from which the finished composite frame member 60 (FIG. 6) of the present invention is manufactured. While the member depicted in the drawings is a framing mullion, it will be understood that the invention can be adapted equally well for use in window frames and other applications where a thermally broken frame member is advantageous.

The extrusion 10 is formed by the conventional extrusion process known to the art and includes an elongated inner metal element comprising a tubular mullion 12 and an elongated outer metal element comprising a face 14. The metal elements 12 and 14 are positioned in adjacent spaced apart relationship with their longitudinal axes being substantially parallel. The metal elements are preferably anodized aluminum, but other materials and finishes may be used without departing from the scope and spirit of the appended claims.

Channels 16 and 17 formed on mutually facing portions 18 and 19 of each elongated metal element are defined by upper channel walls 20 and 21 and lower channel walls 22 and 23. A bar or bridge 24 joining the lower channel walls 22 and 23 connects the tubular mullion 12 and the face 14 and forms the bottom of a longitudinal groove 26 running therebetween. In the preferred embodiment of the invention, the upper and lower channel walls converge toward one another so that the channels 16 and 17 are dovetail shaped.

The extrusion 10 includes glazing pockets 30 formed therein for receiving conventional glazing panels (not shown); longitudinal channels 32 for receiving the edges of conventional glazing stops (not shown) for securing the glazing panels in place; and raceways 34 for receiving the edges of conventional sealing gaskets (not shown) to seal the joint between glazed panels and the face 14 in the conventional manner. Screw slots 36 on the interior of the tubular mullion 12 permit the composite member 60 to be secured in place with conventional screws (not shown).

Referring now to FIG. 2, a wedge-shaped punch 40 aligned substantially perpendicularly to the longitudinal axis of the extrusion 10 shears the upper walls 20, 21 of the channels 16, 17. A plurality of interruptions 42 are formed at intervals along the extrusion as shown in FIGS. 3 and 4. As shown in FIG. 4, a cut away perspective view taken along line 4—4 of FIG. 3, the aluminum material which is punched inwardly by the punch 40 forms lateral tabs 44 protruding inwardly of the channel 16 at substantially right angles to the longitudinal axis of the extrusion. While FIG. 4 shows only the interruptions and lateral tabs formed in the upper channel wall 20, it will be understood that the opposite upper channel wall 21 is sheared in a like manner to form similar lateral tabs 44 protruding into the channel 17. Since the length of each of the tabs 44 depends upon the extent to which the upper channel walls 21, 21 are sheared, the length of the tabs can be controlled by controlling the depth of penetration and the shape of the punch 40, a wider punch forming longer tabs than a narrower punch.

The punch 40 breaks the upper channel walls 20, 21 at the center of the interruption 42 and bends the upper channel wall sections on either side of the break downwardly into the channels 16, 17 to form the tabs 44. In order to bend the tabs to protrude substantially vertically downwardly into the channels, it is necessary for the entire point of the punch 40 to pierce the upper channel walls until the vertical shoulder 41 of the punch 40 is brought to bear against the edges of the interruption 42. In the preferred embodiment of the invention, the width of the punch 40 substantially corresponds to the distance between the inner and outer metal elements 12 and 14, so that the upper channel walls 20, 21 are sheared across their complete widths.

As will be appreciated by those skilled in the art, the punch cannot protrude through the upper channel walls 20, 21 so far as to break the lower channel walls 22, 23 or the bridge 24 in order that the groove 26 can hold a liquid thermoplastic material.

Figure 5:
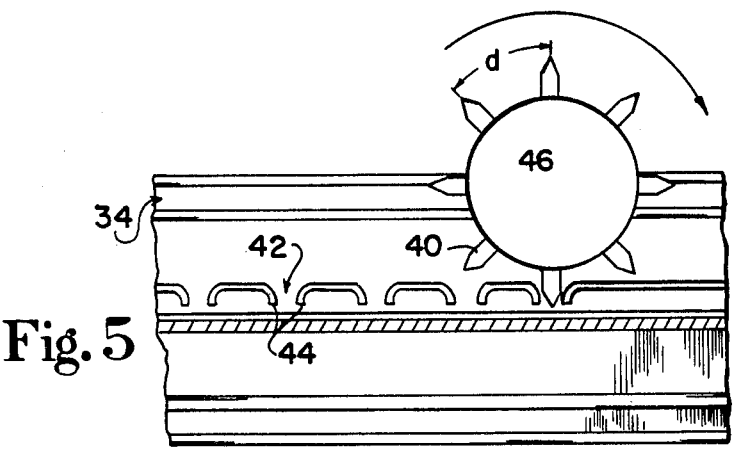
FIG. 5 is a side cutaway view of the extrusion of FIG. 1 showing a rotating wheel with wedge-shaped punches mounted thereon shearing interruptions in the upper walls of the thermal break channels.

FIG. 5 shows a preferred method for shearing the upper walls 20, 21 of the channels 16, 17 on a manufacturing scale, though other methods of shearing the upper walls may be employed without departing from the scope of the invention. A plurality of wedgeshaped punches 40 are mounted on a rotating wheel 46.

The extrusion 10 is passed under the wheel 46 rotating in the direction indicated by the arrow 48, and the punches 40 are spaced evenly about the wheel to shear the upper walls 20, 21 of the channels 16, 17 at the desired intervals. Spacing between the interruptions corresponds to the outer circumferential distance d between the punches 40.

Figure 6:
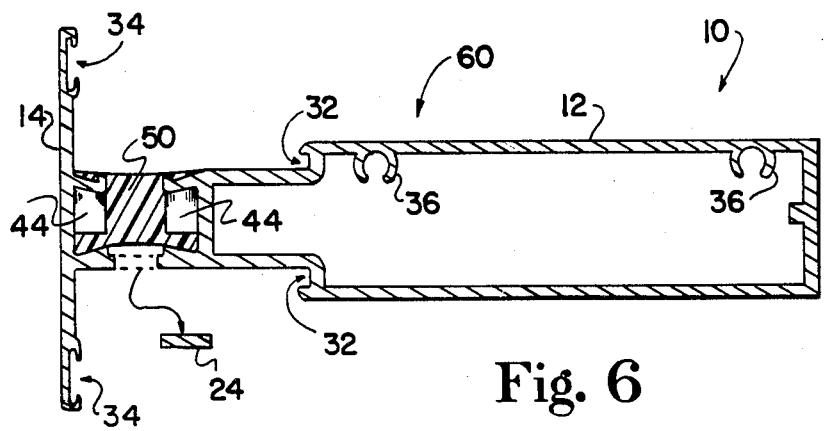
FIG. 6 is an end view of the preferred embodiment of a composite thermally broken frame member showing the connector formed in place and the bottom of the channel debridged.

Referring now to FIG. 6, once the upper walls of the channels have been sheared, a suitable plastic thermal break material, such as polyurethane, PVC, or ABS, is poured into the groove 26. The thermal break material is cured into a solid state to form a rigid connector 50.

The extrusion 10 is then debridged in a conventional manner, such as by passing the extrusion under a routing head, to remove the bridge 24, thereby separating the two aluminum elements. The debridging process is well known to those skilled in the art. The tubular mullion 12 and face 14 are thus connected only by the insulated connector 50, so that there is a thermal break between the inner and outer aluminum elements.

The dovetail shape of the opposing channels 16, 17 provides a mechanical interlock associated with each of the channels to prevent any slippage of the aluminum elements 12, 14 in a lateral direction (indicated by the arrows 52 in FIG. 4) with respect to the connector 50 in response to tensile forces exerted along the lateral axis of the composite member 60. Moreover, the lateral tabs 44 extending into the bulk of the plastic connector 50, as shown in FIG. 6, prevent any slippage of the outer elements in a transverse direction (indicated by the arrows 54 in FIG. 4) in response to shearing forces exerted along the longitudinal axis of the composite member. In this manner, the connector 50 is mechanically interlocked with the tubular mullion 12 and the face 14. The structural integrity of the composite member is therefore not dependent on any adhesive bonding between the thermal break material and the anodized aluminum elements. Thus, it is possible to use insulating plastic materials such as PVC and ABS which do not adhere to aluminum to any appreciable degree.

In the preferred embodiment, the upper and lower channel walls converge toward each other to form dovetail shaped channels which prevent the aluminum elements from pulling laterally away from the connector. However, as will be apparent to those skilled in the art, a variety of cross sectional shapes may be extruded which will provide a mechanical interlock associated with each of the opposing channels to prevent the aluminum elements from pulling laterally away from the connector. One such alternate embodiment includes an extrusion wherein the upper and lower channel walls have a plurality of longitudinal projections formed therein to protrude interiorly of the channel, as disclosed in the aforementioned U.S. Pat. No. 3,204,324, which patent is incorporated herein by reference.

More specifically, FIG. 7 shows a unitary aluminum extrusion 110 from which an alternate embodiment of a composite thermally broken frame member according to the present invention is constructed. The extrusion 110 includes an elongated inner metal element comprising a tubular mullion 112 and an elongated outer metal element comprising a face 114. The metal elements 112 and 114 are positioned in adjacent spaced-apart relationship with their longitudinal axes being substantially parallel. Channels 116 and 117 formed on mutually facing portion 118 and 119 of each elongated metal element are defined by upper channel walls 120 and 121 and lower channel walls 122 and 123. A bridge 124 joining the lower channel walls 122 and 123 connects the inner and outer metal elements 112, 114 and forms the bottom of a longitudinal groove 126 running therebetween.

Upper longitudinal projections 170, 171 depend downwardly from the upper channel walls 120, 121 to project interiorly of the channels 116, 117. Similarly, lower longitudinal projections 172, 173 project upwardly from the lower channel walls 122, 123 to protrude interiorly of the channels 116, 117. After the lateral tabs (not shown) are sheared in the upper channel walls, as hereinabove described for the preferred embodiment, plastic thermal break material is poured into the groove 126. When the thermal break material is cured into a solid state to form a rigid connector (not shown) and the bridge 124 removed, the lateral projections 170–173 are imbedded in the connector to prevent any slippage of the aluminum elements 112, 114 in a lateral direction with respect to the connector in response to tensile forces exerted along the lateral axis of the extrusion 110.

Mechanical interlocks between the metal elements and the connector to prevent lateral displacement of the metal elements in response to tensile forces have been disclosed with respect to extrusions having dovetail-shaped channels and channels having longitudinal projections protruding interiorly thereof. However, other cross-sectional configurations which provide a mechanical interlock to resist lateral displacement of the aluminum elements may occur to those skilled in the art.

The number and spacing of the lateral tabs has a direct and measurable effect on the strength of the composite member. It has been found that a conventional thermal break mullion having no lateral tabs protruding into the connector to prevent transverse slippage of the metal elements will begin to lose adhesion between the connector and the aluminum elements as a result of exposure to loads, temperature changes, and moisture. After a period of use, the strength of a conventional thermal break mullion weakens substantially because of this loss of adhesion. By providing a plurality of lateral tabs extending into the thermal break connector, the strength of the mullion can be largely maintained despite the loss of adhesion between the connector and the aluminum elements.

Finally, it will be understood that the preferred embodiment of the present invention has been disclosed by way of example, and that other modifications may occur to those skilled in the art without departing from the scope and spirit of the appended claims.

What is claimed is:

1. A thermally insulated composite structural framing member for use in window and curtain wall systems and the like, comprising:
    and inner elongated structural element;
    an outer elongated structural element, said elongated structural elements being positioned in adjacent spaced-apart relation with their longitudinal axes being substantially parallel;
    upper and lower longitudinal walls projecting from mutually facing portions of each of said elongated structural elements to define opposing longitudinal channels;
    a plurality of substantially lateral tabs depending from each of said upper channel walls to protrude inwardly of each of said opposing channels;
    a connector of relatively low thermal conductivity formed in situ in said pair of opposing channels to substantially encapsulate said tabs and connect said inner and outer structural elements such that said tabs are embedded in said connector to prevent transverse displacement of said elongated structural elements with respect to said connector; and
    mechanical means associated with each of said opposing channels for preventing lateral displacement of said elongated structural elements with respect to said connector.

2. The thermally insulated composite structural framing member of claim 1, wherein said mechanical means associated with each of said opposing channels for preventing lateral displacement of said elongated structural elements with respect to said connector comprises upper and lower channel walls which converge toward each other to form dovetail-shaped opposing channels.

3. The thermally insulated composite structural framing member of claim 1, wherein said mechanical means associated with each of said opposing channels for preventing lateral displacement of said elongated structural elements with respect to said connector comprises longitudinal projections on at least one of said upper and lower channel walls protruding interiorly of each of said channels, said longitudinal projections being imbedded in said connector.

4. A method for forming an insulated composite structural member for use in window and curtain wall systems and the like, comprising the steps of:
    providing an extruded member having inner and outer elongated elements positioned in adjacent spaced-apart relation with their longitudinal axes being substantially parallel, the extruded member further having upper and lower longitudinal walls projecting from mutually facing portions of the inner and outer elongated elements, the lower channel walls being joined by a bridge to form the bottom of an open longitudinal groove running between the inner and outer elongated elements;
    forming a plurality of substantially lateral tabs depending from each upper channel wall to protrude interiorly of each channel;
    subsequent to said step of forming the tabs, filling the longitudinal groove of the extruded member with an insulating material in a liquid state;
    curing the insulating material to form a solid connector which substantially encapsulates said tabs and engages said opposing longitudinal channels to connect said inner and outer elongated structural elements; and
    removing the bridge joining the inner and outer elongated elements to thermally isolate the inner and outer elements from each other.

5. The method of claim 4, wherein said step of forming tabs on the upper channel walls to protrude inwardly of each channel comprises shearing portions of the upper channel walls inwardly at spaced intervals.

6. The method of claim 7, wherein said step of shearing portions of the upper channel walls inwardly at spaced intervals comprises shearing portions of the upper channel walls inwardly at spaced intervals with a wedge-shaped punch aligned substantially perpendicular to the longitudinal axis of the extruded member.

7. The method of claim 8, wherein said step of shearing portions of the upper channel walls inwardly at spaced intervals with a wedge-shaped punch comprises passing the extruded member under a rotating wheel containing a plurality of wedge-shaped punches radially mounted thereupon so that each of the punches in turn shear the upper channel walls inwardly.

8. The method of claim 8, wherein said step of shearing portions of the upper channel walls with a wedge-shaped punch comprises shearing portions of the upper channel walls with a wedge-shaped punch having a width approximately equal to the spaced-apart distance between the inner and outer elongated elements.

9. A thermally insulated composite structural framing member for use in window and curtain wall systems and the like, comprising:
    an inner elongated structural element;

an outer elongated structural element, said elongated structural elements being disposed in adjacent spaced-apart relation with their longitudinal axis being substantially parallel;

upper and lower longitudinal walls projecting from mutually facing portions of each of said elongated structural elements to define opposing longitudinal channels;

a plurality of substantially lateral tabs having first and second opposed surfaces, said tabs depending from each of said upper channel walls to protrude inwardly of each of said opposing channels;

a connector of relatively low thermal conductivity engaging said opposing longitudinal channels to connect said inner and outer elongated structural elements, said connector intimately contacting substantially all of said first and second opposed surfaces of said tabs and mechanically interlocking with said tabs to prevent transverse displacement of said elongated structural elements with respect to said connector; and mechanical means associated with each of said opposing channels for preventing lateral displacement of said elongated structural elements with respect to said connector.

10. The thermally insulated composite structural framing member of claim 9, wherein said mechanical means associated with each of said opposing channels for preventing lateral displacement of said elongated structural elements with respect to said connector comprises upper and lower channel walls which converge toward each other to form dovetail-shaped opposing channels.

11. The thermally insulated composite structural framing member of claim 9, wherein said mechanical means associated with each of said opposing channels for preventing lateral displacement of said elongated structural elements with respect to said connector comprises longitudinal projections on at least one of said upper and lower channel walls protruding interiorly of each of said channels, said longitudinal projections being embedded in said connector.

12. A method for forming an insulated composite structural member for use in window and curtain wall systems and the like, comprising the steps of:

providing first and second elongated structural elements disposed in adjacent spaced-apart relation with their longitudinal axes being substantially parallel, said elongated structural elements having upper and lower longitudinal walls projecting from mutually facing portions of each of said elongated structural elements to define opposing longitudinal channels;

providing a selectively removable means for forming the bottom of an open longitudinal groove including said opposing channels and the space therebetween, said groove running between the first and second elongated elements;

forming a plurality of substantially lateral tabs depending from each upper channel wall to protrude interiorly of each channel;

subsequent to said step of forming the tabs, filling the longitudinal groove running between the first and second elongated elements with an insulating material in a liquid state;

curing the insulating material to form a solid connector which substantially encapsulates said tabs and engages said opposing longitudinal channels to connect said first and second elongated structural elements; and removing the selectively removable means forming the bottom of the groove to thermally isolate the first and second elongated structural elements from each other.

13. The method of claim 12, wherein said step of forming tabs on the upper channel walls to protrude inwardly of each channel comprises shearing portions of the upper channel walls inwardly at spaced intervals.

14. The method of claim 13, wherein said step of shearing portions of the upper channel walls inwardly at spaced intervals comprises shearing portions of the upper channel walls inwardly at spaced intervals with a wedge-shaped punch aligned substantially perpendicular to, the longitudinal axes of the elongated structural elements.

15. The method of claim 14, wherein said step of shearing portions of the upper channel walls inwardly at spaced intervals with a wedge-shaped punch comprises passing the elongated structural elements under a rotating wheel containing a plurality of wedge-shaped punches radially mounted thereupon so that each of the punches in turn shear the upper channel walls inwardly.

16. The method of claim 14, wherein said step of shearing portions of the upper channel walls with a wedge-shaped punch comprises shearing portions of the upper channel walls with a wedge-shaped punch having a width approximately equal to the spaced-apart distance between the inner and outer elongated elements.

* * * * *